US 8,572,551 B2

(12) United States Patent
Feger et al.

(10) Patent No.: US 8,572,551 B2
(45) Date of Patent: Oct. 29, 2013

(54) DIFFERENCE LOG PRODUCTION FOR MODEL MERGING

(75) Inventors: Felix Feger, Düsseldorf (DE); Christian Gerth, Detmold (DE); Jochen M. Kuester, Zurich (CH); Jussi H. Vanhatalo, Zurich (CH); Hagen Voelzer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1348 days.

(21) Appl. No.: 12/339,706

(22) Filed: Dec. 19, 2008

(65) Prior Publication Data

US 2009/0187881 A1    Jul. 23, 2009

(30) Foreign Application Priority Data

Dec. 20, 2007   (EP) ................................ 07123835

(51) Int. Cl.
*G06F 9/44* (2006.01)
*G06F 9/45* (2006.01)

(52) U.S. Cl.
USPC .......................................... 717/104; 717/144

(58) Field of Classification Search
USPC ...................................................... 717/104
See application file for complete search history.

(56) References Cited

U.S. PATENT DOCUMENTS

| | | | |
|---|---|---|---|
| 2003/0191869 A1* | 10/2003 | Williams et al. | 709/328 |
| 2005/0027495 A1* | 2/2005 | Matichuk | 703/2 |
| 2005/0060317 A1 | 3/2005 | Lott | |
| 2006/0041579 A1* | 2/2006 | Miyashita et al. | 707/102 |
| 2006/0123404 A1* | 6/2006 | O'Brien et al. | 717/140 |
| 2006/0224425 A1 | 10/2006 | Homann et al. | |
| 2006/0282458 A1 | 12/2006 | Tsyganskiy | |

OTHER PUBLICATIONS

Faster and More Focused Control-Flow Analysis for Business Process Models Through SESE Decomposition Jussi Vanhatalo, Hagen Völzer, and Frank Leymann, IBM Zurich Research Laboratory, Säumerstrasse , CH-8803 Rüschlikon, Switzerland, Institute of Architecture of Application Systems, University of Stuttgart, Sep. 2007.*

IBM, "Methodology and Tooling for Merging of Business Processes with Automated Correspondence Calculation", IP com, IPCOM000151093D, Apr. 20, 2007.

* cited by examiner

*Primary Examiner* — Li B Zhen
*Assistant Examiner* — Arshia S Kia
(74) *Attorney, Agent, or Firm* — William Stock; Anne Vachon Dougherty

(57) ABSTRACT

Methods and apparatus are provided for production of a difference log in a data processing system. The difference log defines differences between process models defined in system memory. For each of the process models, model structure data provided in memory defines a hierarchy of SESE regions representing the structure of that model. Also provided in memory are model comparison data defining correspondences between elements of the models, and region comparison data defining correspondences between regions of the SESE region hierarchies for the models. The model comparison and region comparison data are analyzed to identify differences between the SESE region hierarchies, and a difference log defining said differences is produced. In preferred systems, the model structure data and the region comparison data are computed for the models, and the difference log has a hierarchical structure corresponding to the structure of the process models.

20 Claims, 9 Drawing Sheets

DIFFERENCE LOG PRODUCTION FOR MODEL MERGING

FIELD OF THE INVENTION

This invention relates generally to the production of difference logs for use in merging of process models. Methods, systems and computer programs are provided for producing a difference log which defines differences between process models in a data processing system.

BACKGROUND OF THE INVENTION

Model-driven engineering (MDE) is a technique employed in various engineering fields such as software, system and data engineering. MDE involves the systematic use of models as primary engineering artifacts. For example, model-driven software development or model-driven business transformation relies on the use of models such as models defined in the Unified Modeling Language (UML). When dealing with business process models for instance, a model merging scenario often arises where two or more models have to be brought together in some way. One scenario for model merging is the improvement of an existing process model by a reference model, where some parts of the existing model should be preserved and others should be replaced. Merging of process models is also required when different models need to be brought into some degree of conformity. A simple example of this is the merging of business process models when companies are subject to acquisitions and mergers. In such situations, processes have to be aligned at the business and IT level, while identifying and preserving differences where appropriate. Another merging scenario arises if two or more different versions of the same model need to be integrated. For example, where models are manipulated in a distributed manner by several modelers, changes made in different models must be consolidated at some point and an integrated, consolidated model created. Here, differences must be analyzed and parts of different copies must be merged into the integrated model.

Existing techniques and tools offer only limited support for process model merging. For example, most existing merging tools rely on existence of a log which records the changes that have been made to a model and thus provides an indication of differences which need to be addressed. Some prior work has proposed use of a comparison, consisting of correspondences between elements of two process models, as a basis for resolving some differences between process models by a model merging activity. For example, a technique for comparing models using different types of correspondences between model elements is disclosed in "Methodology and Tooling to combine an existing legacy business process model with best-practice industry reference models for Business Transformation", Jochen Küster et al., IBM Zurich Research Laboratory, Business Integration Technologies Technical Report RZ 3663 IBM Zurich Research Laboratory. This establishes the idea of using different types of correspondences between a model A and a model B: a 1-1 correspondence between two process model elements specifies that the two model elements have the same semantics; a 1-0 correspondence specifies that for a given element in model A no corresponding element in B exists; a 0-1 correspondence is the reverse, specifying that for a model element in B no corresponding one in A exists. "Improving Business Process Models with Reference Models in Business-Driven Development", J. M. Küster, J. Koehler, K. Ryndina, 2nd Workshop on Business Processes Design (BPD'06), LNCS, Springer-Verlag, September 2006 describes how the existence of a certain type of correspondence can be used to select a suitable merging operation. For example, if a 1-0 correspondence for an element e1 in a process model A exists with regard to a process model B, then an add operation can be used to add the element e1 to process model B or a remove operation can be used for removing element e1 from process model A.

So far, correspondences have been used to identify elements that have been added or removed from a process model. However, there are also other changes that can occur. For example, elements of a process model can be reordered, causing changes to the control or data flow (referred to collectively herein as control flow changes) of a model. Control flow changes are more difficult to detect and also have an influence on addition and removal of elements. Further, existing techniques lack the sophistication required to handle addition and deletion of control action node elements, such as decision, merge, fork and join elements. If addition of such elements is done in isolation then an invalid model can easily be created.

SUMMARY OF THE INVENTION

One aspect of the present invention provides a method for production in a data processing system of a difference log defining differences between process models defined in memory of the system. The method comprises:

for each of the process models, providing in the memory model structure data defining a hierarchy of SESE regions representing the structure of that model;

providing in the memory model comparison data defining correspondences between elements of the models;

providing in the memory region comparison data defining correspondences between regions of the SESE region hierarchies for the models;

analyzing the model comparison data and the region comparison data to identify differences between the SESE region hierarchies; and producing a difference log defining said differences in the memory, the difference log indicating, for each difference, a region of at least one of said SESE region hierarchies in which that difference occurs.

Thus, in embodiments of the present invention, a difference log defining differences between process models can be produced automatically based on representations of the process model structure as a hierarchy of SESE regions. In particular, in addition to model comparison data which defines correspondences between elements of the models, region comparison data is provided. This defines correspondences between regions of the SESE region hierarchies for the models. By analyzing both the model comparison data and the region comparison data, differences between the SESE region hierarchies can be identified. Based on this analysis, a difference log can be generated in which differences are associated with regions of a SESE region hierarchy in which they occur. This greatly facilitates identification and appropriate handling of the differences that need to be resolved in model merging processes. For each region, any differences occurring in that region can be identified from the difference log and differences can be addressed on a region by region basis throughout the SESE region hierarchy. Different categories of differences can be identified, for instance control flow differences can be identified as well as mere addition or deletion of model elements, and dependencies between differences that are important in process merging can be detected and dealt with accordingly. Moreover, this technique provides a basis for systematic resolution of differences which does not rely on the prior existence of a change log.

Rather, the difference log corresponds in effect to one possible change log, and one which, by linking differences to the process model structure via the SESE regions, provides the basis for efficient and comprehensive difference resolution in process merging operations.

In general, for any given difference defined in the difference log, the log could indicate, directly or indirectly, one or more regions of one or more of the SESE region hierarchies to which that difference relates. However, in preferred embodiments, the difference log defines a hierarchy of regions corresponding to a combined SESE region hierarchy which combines the SESE region hierarchies for the models and is defined by combined hierarchy data in the memory. Each difference is then indicated in the region of the difference log hierarchy corresponding to the region of the combined SESE region hierarchy in which that difference occurs. Here, the region of a given SESE region hierarchy in which a difference occurs can be indicated simply by inclusion of that difference in the region of the difference log hierarchy corresponding to the appropriate combined hierarchy region. Thus, a structured difference log is produced, the difference log having a hierarchical structure corresponding to the structure of the process models. This provides an efficient difference representation which can be displayed to a user for convenient, user-friendly visualization and resolution of differences as discussed further below.

Methods embodying the invention preferably include, in response to user input indicating a region of a said SESE region hierarchy, identifying from the difference log any differences associated with that region, and producing a difference display displaying those differences to the user. In general, associated differences here could be those indicated by the log as occurring in the user-specified region and/or those occurring in the corresponding region(s) of the or each other SESE region hierarchy. However, in the preferred case just described where the difference log has a hierarchical structure, in response to a user input indicating a region of a SESE region hierarchy, any differences indicated in the corresponding region of the difference hierarchy can be identified and displayed in the difference display. To further facilitate assessment and handling of differences, the difference display preferably includes a representation of the user-specified SESE region plus a representation of any corresponding region(s) of the or each other SESE region hierarchy.

Embodiments can be envisaged in which the combined hierarchy data has been previously generated and stored in memory for the process models in question. However, the process of difference log production may include processing the region comparison data and the model structure data for the models to generate the combined hierarchy data. Similarly, the region comparison data for the process models may have been previously generated and stored in memory in some embodiments. In other embodiments, the difference log production process may include the steps of comparing regions of the SESE region hierarchies defined by the model structure data to detect the correspondences between regions, and generating the region comparison data defining those correspondences. Embodiments can also be envisaged in which the model structure data defining the SESE region hierarchies has been previously generated for the models. For example, more sophisticated metamodels might be available in future whereby SESE regions are inherent in the basic definition of a model. Thus, the model structure data which defines the SESE region hierarchy could be the fundamental model definition in the system. However, allowing for less sophisticated model definitions, the difference log production process may include the steps of analyzing a model defined in system memory to detect hierarchical SESE regions thereof, and generating the model structure data defining the SESE region hierarchy for that model. This may be done for one or more of the models as required.

Where the region comparison data is generated automatically in the difference log production, the model comparison data be updated after generation of the region comparison data to include any new correspondences between elements of corresponding regions of the two models. This will be discussed further below. Similarly, in response to user input modifying a process model to eliminate a difference, the model structure data for that model can be updated accordingly and the difference log updated to eliminate that difference. The update process here can involve updating correspondences between model elements and/or SESE regions as required.

Preferred embodiments include various additional features to facilitate merging operations. For example, embodiments can suggest insertion points in a SESE region hierarchy for hierarchy elements which need to be moved or inserted to resolve a difference between the models. Embodiments can also filter identified differences, such as differences relating to control action node elements, to eliminate differences which are not of interest to the merging operation. These techniques will be discussed further below.

A second aspect of the invention provides a computer program comprising program code means for causing a data processing system to perform a method according to the first aspect of the invention. It will be understood that "data processing system" is used here in the most general sense and includes any device, component or distributed system which has a data processing capability for implementing a computer program. Such a computer program may thus comprise separate program modules for controlling different components of a distributed system where provided. Moreover, a computer program embodying the invention may constitute an independent program or may be a component of a larger program, and may be supplied, for example, embodied in a computer-readable medium such as a disk or an electronic transmission for loading in a computer system. The program code means of the computer program may comprise any expression, in any language, code or notation, of a set of instructions intended to cause data processing system to perform the method in question, either directly or after either or both of (a) conversion to another language, code or notation, and (b) reproduction in a different material form.

A third aspect of the invention provides a system for producing a difference log defining differences between process models. The system comprises:

memory for storing, for each of the process models, model structure data defining a hierarchy of SESE regions representing the structure of that model, model comparison data defining correspondences between elements of the models, and region comparison data defining correspondences between regions of the SESE region hierarchies for the models; and control logic adapted to analyze the model comparison data and the region comparison data to identify differences between the SESE region hierarchies, and to produce and store in the memory a difference log defining said differences, the difference log indicating, for each difference, a region of at least one of said SESE region hierarchies in which that difference occurs.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF THE INVENTION

The present invention makes use of a technique not previously applied in the field of process model merging as a basis for addressing various issues with prior techniques discussed above. This technique involves Single-Entry-Single-Exit (SESE) regions. SESE regions originated in work on compiler theory and are discussed in: "The Program Structure Tree: Computing control regions in linear time", R. Johnson, D. Pearson, and K. Pingali, Proceedings of the ACM SIGPLAN'94 Conference on Programming Language Design and Implementation, pages 171-185, June 1994; and "Faster and More Focused Control-Flow Analysis for Business Process Models through SESE Decomposition", J. Vanhatalo, H. Völzer, and F. Leymann, LNCS 4749, pp. 43-45, Springer September 2007. Briefly, a SESE region is a defined subset of the set of elements and their interconnecting edges which make up the structure of a model as will be explained in more detail below.

Figure 1:
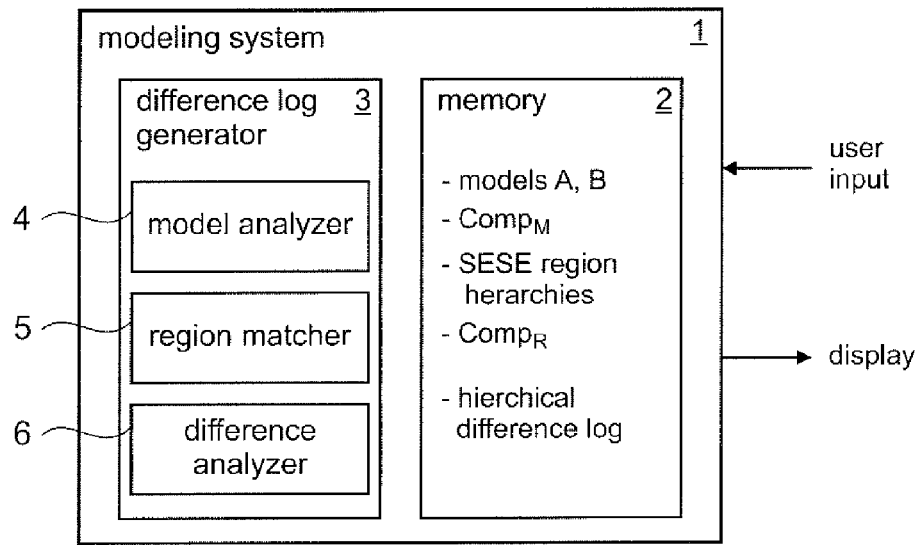
FIG. 1 is a schematic representation of a modeling system incorporating a difference log production system embodying the invention.

FIG. 1 is a schematic representation of a modeling system, indicated generally at 1, showing the main components involved in the difference log production process. In this embodiment the system 1 is implemented by specialized software running on a general-purpose computer with the usual user interfaces for input and display. The main components of system 1 are represented generally in the figure by memory 2 and a difference log generator 3. The difference log generator 3 includes components indicated as a model analyzer 4, a region matcher 5 and a difference analyzer 6. The system memory 2 stores various information for operation of the system, including process models A and B, defined by respective software modules, and model comparison data "$Comp_M$"

for the two models as described below. The memory 2 also holds various other data generated in operation of the system. This comprises model structure data, defining a hierarchy of SESE regions for each of models A and B, region comparison data "$Comp_R$" described further below, and the difference log itself which is based on a combined SESE region hierarchy for the models as described below. The difference log generator 3 comprises control logic for implementing the difference log production process described below. In general, this control logic could be implemented in hardware, software or a combination thereof. In this embodiment, however, the difference log generator logic is implemented by software running on computer system 1, with respective software modules providing the model analyzer 4, region matcher 5 and difference analyzer 6. Suitable software will be apparent to those skilled in the art from the description of operation herein.

The difference log production is described below in relation to merging of two process models A and B. The model merging process utilizes model comparison data in the form of comparison file $Comp_M$ which defines correspondences between elements of the two models. Various systems are known for defining correspondences between model elements, for example as described in the documents referenced earlier. The preferred embodiment described here employs the correspondence system disclosed in the Küster et al. references above. Briefly, using this system the comparison $Comp_M$ can include different types of correspondences such as a 1-1 correspondence, a 1-0 correspondence and a 0-1 correspondence described earlier. Further correspondences include the 1-many (1-m) correspondence and the many-1 (m-1) correspondence which specify that a single element of one model corresponds to a number of elements in the other model. By analyzing the correspondences between elements of models A and B in accordance with this system, the comparison $Comp_M$ can be derived as a correspondences file for the models specifying the identities of corresponding elements in the two models. The particular way in which this comparison is derived is not central to the present invention and need not be described here. It suffices that such a comparison defining correspondences between the model elements is provide in memory 2 for use in generation of the difference log.

Figure 2:
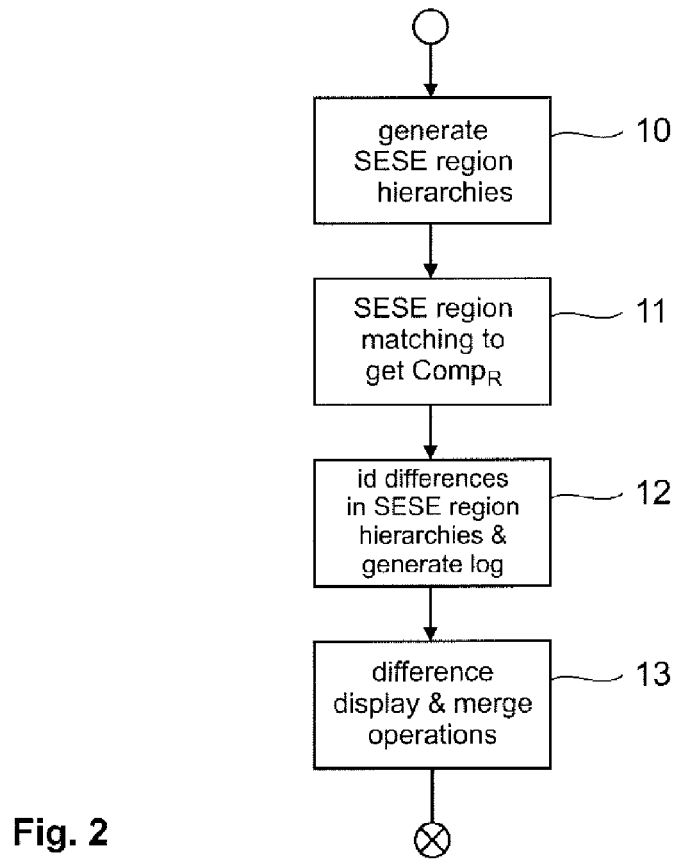
FIG. 2 is a flow chart illustrating key steps in operation of the difference log production system.

The flow chart of FIG. 2 provides an overview of system operation, indicating the main steps of a model merging process involving generation of a difference log. Step 10 of this figure represents generation of the model structure data defining the SESE region hierarchies for models A and B. This step is performed by model analyzer 4 of difference log generator 3 based on analysis of the model definitions in memory 2. The process of generating the SESE region hierarchies is described in more detail below with reference to FIGS. 3 and 4. Step 11 of FIG. 2 represents generation of the region comparison data $Comp_R$. This step is performed by region matcher 5 of difference log generator 3 and essentially involves comparing regions of the SESE region hierarchies to identify corresponding, or "matching", regions in the two hierarchies. The result of this process is a region comparison file $Comp_R$, similar to the model comparison file $Comp_M$, but defining the identified correspondences between regions of the two SESE region hierarchies. The region matching process will be discussed in more detail below.

Step 12 of FIG. 2 represents the core of the difference log generation process. This is performed by the difference analyzer 6 of difference log generator 3 and involves analysis of the model comparison file $Comp_M$ and the region comparison file $Comp_R$ to identify differences between the SESE region hierarchies for the models. This step involves identification of various different categories of differences as discussed in more detail below. The identified differences are stored in the form of a hierarchical difference log structure in system memory 2. The hierarchical structure of the difference log reflects the hierarchical structure of the process models. In particular, the difference log structure is based on a combined SESE region hierarchy which combines the SESE region hierarchies for the two models. Generation of the combined hierarchy will be described further below. In the hierarchical difference log, differences are associated with the regions of the model region hierarchies in which they occur by indicating each difference in the appropriate region of the combined hierarchy structure. In this preferred embodiment, the difference log also records, for each region of the difference hierarchy, the basic structure of the corresponding region(s) of the two model region hierarchies. This provides the basis for an exceptionally user-friendly difference display as demonstrated below. Where appropriate, differences are recorded in the difference log by difference analyzer 6 in the form of an instruction or operation to be performed to resolve that difference. For example: a difference concerning a missing element x might be expressed as "add element x"; a difference relating to reordering of elements might be expressed as "move element y", and so on. Difference analyzer 6 also performs various subsidiary tasks such as identification of possible insertion points for elements to be added or moved, and filtering of identified differences relating to control action nodes. These tasks will be discussed further below.

After generation of the difference log, differences can be displayed to a user who can interact with the system to modify the models to eliminate differences. This process is represented by step 13 of FIG. 2. The user can call up a difference display displaying the contents of the difference log corresponding to any region of the SESE region hierarchies. In particular, in this embodiment, a user can input any region of either hierarchy, and the system will display the contents of the corresponding region of the difference log hierarchy. The difference display also includes a representation of the corresponding regions of the two model hierarchies. The user can thus navigate through the hierarchical model structure, viewing the corresponding regions of the difference log, and can equally navigate through the difference log hierarchy viewing the relevant structure of the two process models. The difference display produced by difference log generator 3 will be illustrated by examples below. When viewing differences, the user can modify either model as required to eliminate differences. The user can, for example, select a hierarchy region and resolve all differences within that region. In any case, in response to user input changing a model, the model analyzer 4 can update the SESE region hierarchy representation accordingly, and the difference analyzer 6 can update the difference log to reflect the change. Where appropriate depending on the nature of the modification, the difference analyzer 6 will also update the correspondence files $Comp_M$ and $Comp_R$ to reflect any altered correspondences.

Figure 3:
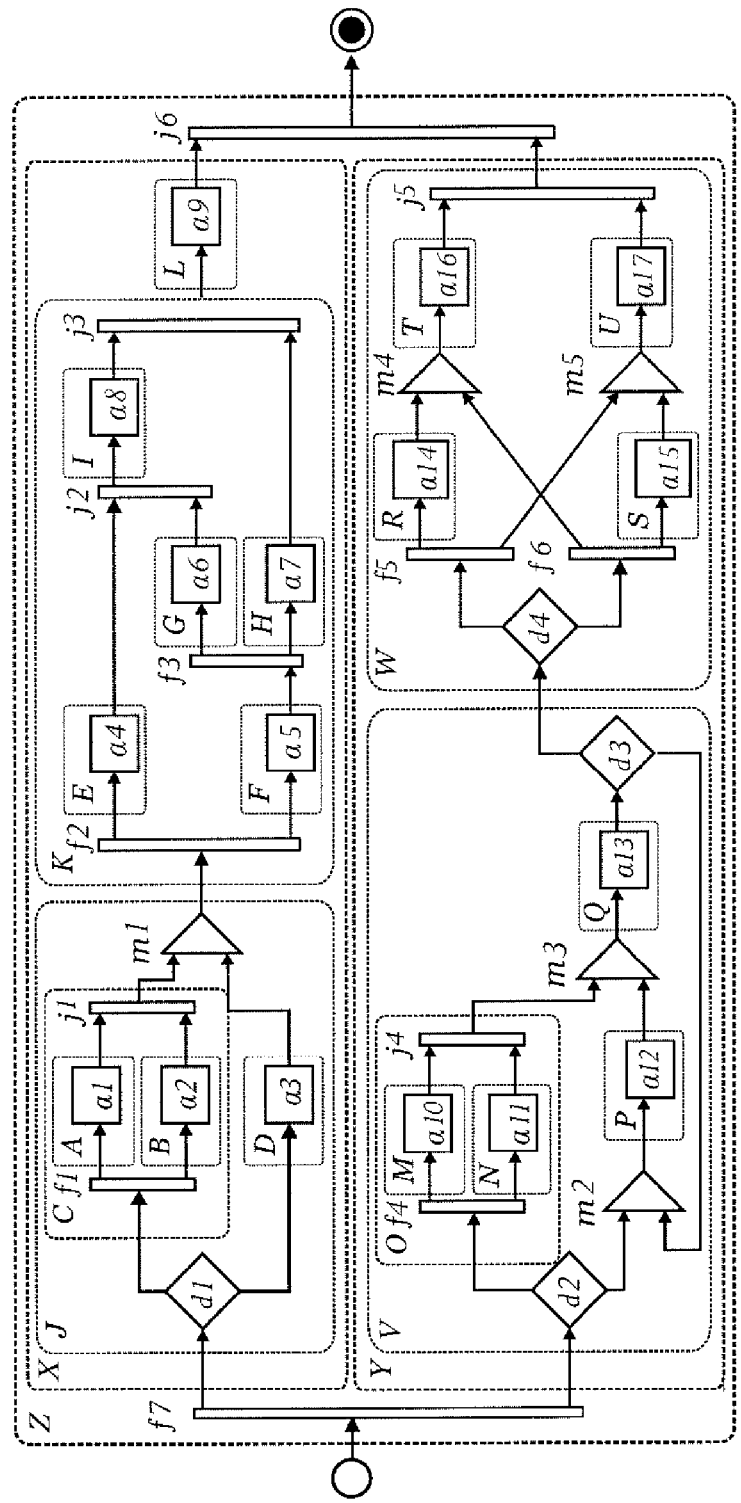
FIG. 3 illustrates decomposition of a process model into SESE regions.

The process of generating the SESE region hierarchies in step 10 of FIG. 2 will now be explained in more detail. In order to associate differences between process models with the areas in which they occur, the structure of each process model is computed by model analyzer 4 using the concept of SESE regions as illustrated in FIG. 3. This figure shows a simple process model and its decomposition into SESE regions. A SESE region is depicted as a dotted box. Let G=(N, E) be a process model, where N is the set of nodes in the process model and E is the set of edges in the process model.

A SESE (single-entry-single-exit) region ("region" for short) R=(N', E') is a nonempty subgraph of G, i.e., N'⊆N and E"=E∩(N'×N') such that there exist edges e, e'∈E with E∩((N\N')×N')={e} and E∩(N'×(N\N'))={e'}; e and e' are called the entry and the exit edge of R respectively.

The process model in FIG. 3 has more regions than those that are shown explicitly. For example, the union of the regions J and K, denoted J∪K, as well as K∪L are also regions. These, however, are not interesting to us and they are subsumed in region X. Interesting regions will be called "canonical" as defined in the following. We say that two regions R and R' are in sequence if the exit edge of R is the entry edge of R' or vice versa. The union R∪R' of two regions R and R' that are in sequence is a region again. A region R is non-canonical, if there are regions X, Y, Z such that X and Y are in sequence, R=X∪Y, and R and Z are in sequence, otherwise R is said to be canonical. The regions shown in FIG. 3 are exactly the canonical regions of that process model. Since canonical regions are the most interesting for our purposes, only canonical regions are considered in the preferred system of FIG. 1. In the following description of operation, therefore, we will mean 'canonical region' whenever we say 'region'.

Figure 4:
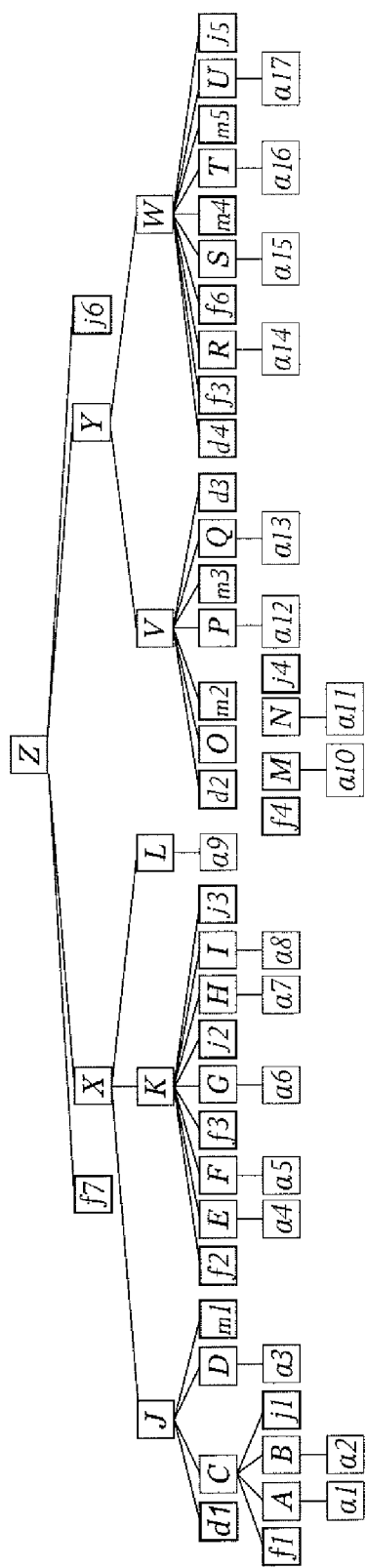
FIG. 4 illustrates a process structure tree representing the hierarchy of SESE regions in FIG. 3.

For each process model A and B in memory 2, model analyzer 4 calculates the SESE regions as defined above using known techniques of compiler theory as detailed in the references given earlier. Since canonical regions do not overlap but are either nested or disjoint, it is possible to organize the canonical regions in a unique tree. We call this tree the "process structure tree" of a process model. This process structure tree is computed by model analyzer 4 in this embodiment as a convenient representation of the SESE region hierarchy of a model. The process structure tree can be computed in time linear in the size of the process model. FIG. 4 shows the process structure tree representing the region hierarchy of the process model from FIG. 3. A region is represented as a boxed tree node. In addition, the nodes of the process model are represented for convenience as leaves in the tree. The parent of a region R (being a process model node n) is the smallest region R' that contains R (node n). We then also say that R is a child region of R' (n is a child node of R').

Thus, on completion of step 10 of FIG. 2, the process structure trees representing the SESE region hierarchies for models A and B are stored in memory 2. Region matcher 5 then analyzes these hierarchies, performing a region matching process to identify corresponding (matched) regions in the two hierarchies. Basically this process involves comparing regions of the two hierarchies and applying some predefined matching strategy to determine whether regions are matching or not. Various matching strategies could be employed as desired here, but in the following we describe an exemplary matching strategy which can be applied by region matcher 5.

Figure 5:
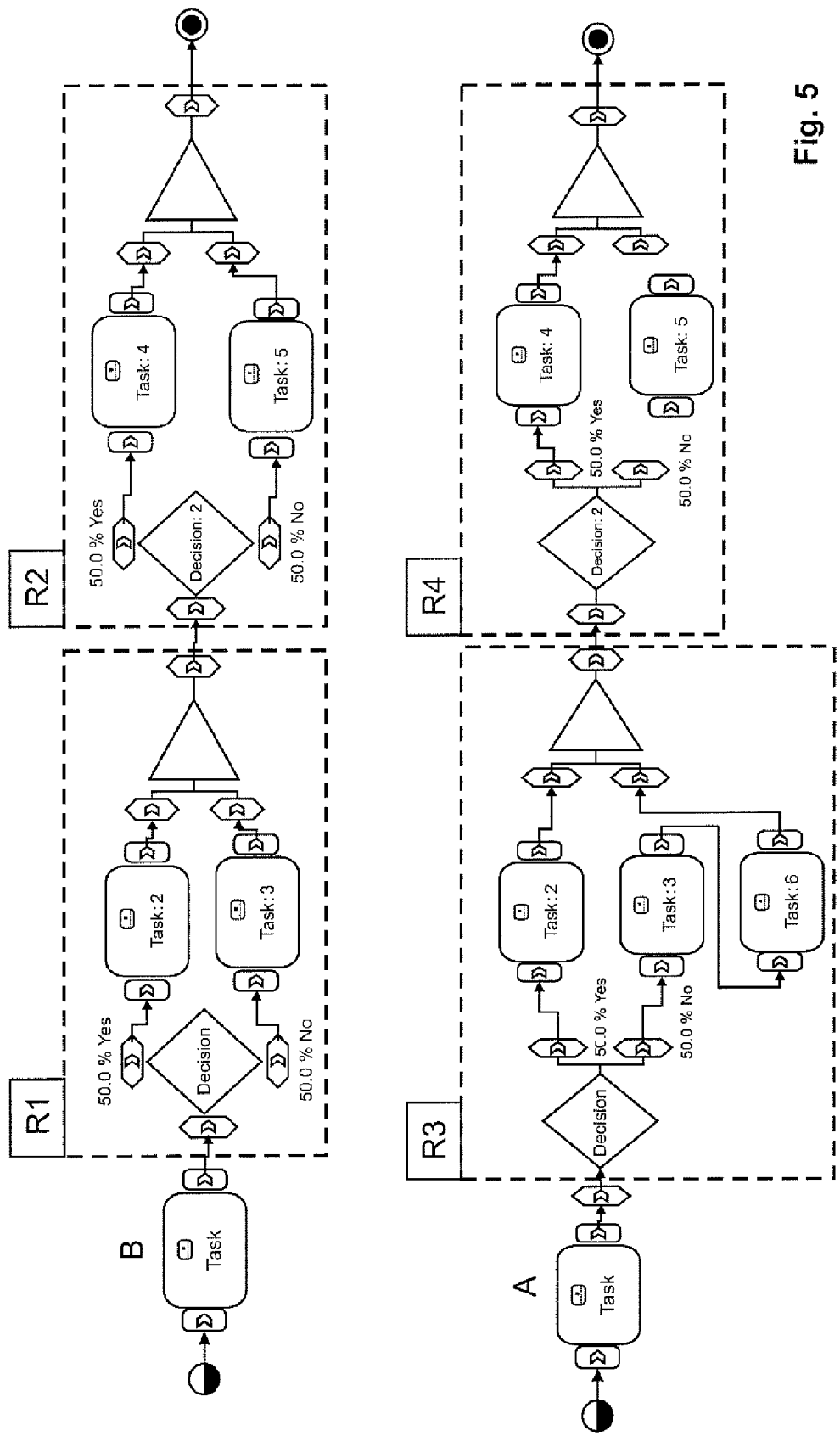
FIG. 5 shows SESE regions of two models illustrating region matching considerations.

FIG. 5 illustrates the SESE region matching problem. It shows four SESE regions that have been identified in two process models A and B. However, identifying the SESE regions in both process models does not automatically establish a connection between regions in the two models. As a first strategy for matching, one could consider two regions to be matched if they contain corresponding entry and exit elements. For example, in FIG. 5, this strategy would indicate a match if the control action nodes (i.e. decision, merge) have 1-to-1 correspondences in the file $Comp_M$ and have not been deleted and recreated. However, if the latter condition is not satisfied, the strategy will not lead to a matching. In such a case, one might consider a matching based on the enclosed elements. We first describe a number of different strategies for matching and then explain a comprehensive strategy adopted in this embodiment:

Strategy S1: Given a region R1 and a region R2, they are considered to be matching if they have corresponding entry and exit nodes.

Strategy S2: Given a region R1 and a region R2, they are considered to be matching if they have a corresponding entry or exit node.

Strategy S3: Given a region R1 and a region R2, they are considered to be matching if they have corresponding elements inside.

Strategy S4: Given a region R1 and a region R2, they are considered to be matching if they contain regions R3 and R4 which are matching.

A combination of individual strategies is required as only one strategy will lead to bad results. For example, strategy S1 individually will lead to lots of unmatched regions if control nodes are deleted and recreated. The comprehensive strategy employed by region matcher 5 in this embodiment involves the following steps:

1. Given a set of regions R, we compute a matching according to S4. If we get more than one candidate, we apply strategy S3. We remove all matched regions from the set of regions R.
2. Given a set of regions R, we compute a matching according to S3. If we get more than one candidate, we apply strategy S1 and S2. We remove all matched regions from the set of regions R.
3. Given a set of regions R, we compute a matching according to S2. We remove all matched regions from the set of regions R.
4. Given a set of regions R, we compute a matching according to S1. We remove all matched regions from the set of regions R.

This strategy first searches for matching regions based on already matched regions within the candidates and based on matching elements inside the regions. Suitable algorithms for implementing this strategy in region matcher 5 will be apparent to those skilled in the art. The result of the region matching process is the region correspondences file $Comp_R$ defining the matched regions of the two SESE region hierarchies. After this process, region matcher 5 may update the model element correspondences file $Comp_M$ to include any new correspondences resulting from matching of SESE regions. This will be described further below.

As indicated above, the core difference log generation process is performed by difference analyzer 6 in step 12 of FIG. 2. This involves computing a combined SESE region hierarchy for the models and identifying and recording differences associated with the various regions of this hierarchy. In particular, difference analyzer 6 processes the individual region hierarchies for models A and B in conjunction with the region correspondences file $Comp_R$ to generate combined hierarchy data defining this combined SESE region hierarchy. The combined hierarchy is represented in the form of a combined SESE tree which is generated from the individual process structure trees for models A and B in accordance with the following process.

Given two process structure trees $SESE_{TREE}(V_1)$, $SESE_{TREE}(V_2)$ and correspondences between their nodes defined by the correspondence file $Comp_R$, then the combined SESE tree is denoted by $SESE_{TREE}(V_1, V_2)$. We also assume a function father: $V \rightarrow V$ which maps a node $v \in V$ to its father in the SESE tree. The combined SESE tree can be constructed as follows:

for a node $v_1 \in SESE_{TREE}(V_1)$ that has a corresponding node $v_2 \in SESE_{TREE}(V_2)$, a node $v_3$ is inserted into $SESE_{TREE}(V_1, V_2)$ with father($v_3$)=father($v_2$);

for a node $v_1 \in SESE_{TREE}(V_1)$ that does not have a corresponding node, a node $v_3$ is inserted into $SESE_{TREE}(V_1, V_2)$ with father($v_3$)=father($v_1$);

for a node $v_2 \in SESE_{TREE}(V_2)$ that does not have a corresponding node, a node $v_3$ is inserted into $SESE_{TREE}(V_1, V_2)$ with father($v_3$)=father($v_2$).

The Following pseudo Code Indicates this Process:

```
// createJointSESETree( ) is invoked with the root region of the
primary model
// createJointSESETree( primaryModel.getRootRegion( ) )
create JointSESETree( Region region ) {
    // create node that represents the given region in the tree
    node = new Node( region )
    // add all subregions of the given region to the tree
    foreach subRegion of region {
        node.addChildren( create JointSESETree( subRegion ) )
    }
    // add all subregions of secondary model that have no
    corresponding subregion in the primary model
    if (region is in the primary model) {
        foreach subRegionB of region.getCorrespondingRegion( ) {
            if (subRegionB.getCorrespondingRegion( ) == null) {
                // subRegionB has no counterpart in the primary model
                node.addChildren( create JointSESETree(
                    subRegionB ) )
            }
        }
    }
}
```

Having computed the combined SESE tree for the models, difference analyzer 6 can generate the hierarchical difference log by identifying and recording differences occurring in the various regions of the combined SESE hierarchy. That is, a difference occurring in a region of one of the two model region hierarchies, say the model A hierarchy, is recorded in the difference log for the region of the combined SESE region hierarchy which corresponds to that model A region. In this embodiment, this is performed by enriching the nodes of the combined SESE structure tree with the identified differences. This is done as follows for differences expressed by operational instructions "Move", "Delete" and "Insert" as discussed further below:

if difference=Insert then difference is associated with the node representing the region in which difference takes place;

if difference=Delete then difference is associated with the node representing the region in which difference takes place;

if difference=Move then difference is associated with the node representing the region into which the element is moved and the node representing the region out of which the element is moved;

if difference=InsertRegion or difference=DeleteRegion, then difference is associated with the node in $SESE_{TREE}(V_1, V_2)$ representing this region.

The resulting difference log represents, in effect, one possible change log for the two process models. Differences are identified by analyzing the model and region correspondences files $Comp_M$ and $Comp_R$ for various different categories of differences. The difference analyzer can distinguish between the following types of differences that can occur:

Category 0—differences between two corresponding model elements
Category 1—differences between the sets of elements (excluding edges)
Category 2—simple control flow differences
Category 3—complex control flow differences.

A difference between two corresponding model elements (Category 0) occurs if attributes of a task or subprocess have been changed. Category 1 differences occur if model elements such as tasks or subprocesses are deleted or added to one of the models. Category 2 differences deal with the situation that tasks or subprocesses have been reordered. Category 3 differences occur if parallel or alternative regions are added or deleted.

Difference analyzer 6 calculates Category 0 differences by comparing corresponding elements and then comparing each of the attributes. Category 1 differences can be easily calculated: each 0-1 correspondence and 1-0 correspondence gives rise to such a difference. Category 2 differences are calculated using two approaches: for control-flow changes within a SESE region, difference analyzer 6 uses a method described below. Control-flow changes across SESE regions can be detected by comparing elements of each SESE region that do not have 0-1 or 1-0 correspondences. Category 3 differences are calculated simply by identifying newly inserted and deleted SESE regions. In the following, we elaborate on the calculation and visualization of Category 2 differences and Category 3 differences.

Category 2 differences can occur due to two changes: elements may have been moved from one region to another, and elements may have been moved within a region. The former changes can be easily identified as follows. For each element in the primary model, e.g. model B, the corresponding element in the secondary model, model A, is identified from the $Comp_M$ file. For each element, the SESE region directly enclosing that element is identified from the corresponding region hierarchy. Difference analyzer 6 then determines from the $Comp_R$ file whether the two regions have been matched. If yes, the element in the secondary model A has not been moved to another region compared to primary model B, otherwise it has been moved. The following algorithm gives an implementation of this process.

For all Elements e in the Primary Model

```
{
    secondaryelement = getCorrespondingElement(e);
        Region rprimary = e.getParentRegion( );
    Region rsecondary = secondaryelement.getParentRegion( );
    If (!rprimary.getMatchingRegion( ) == rsecondary)
    {
        AbstractDifference = new MoveDifference(secondaryelement);
    }
}
```

Figure 6:
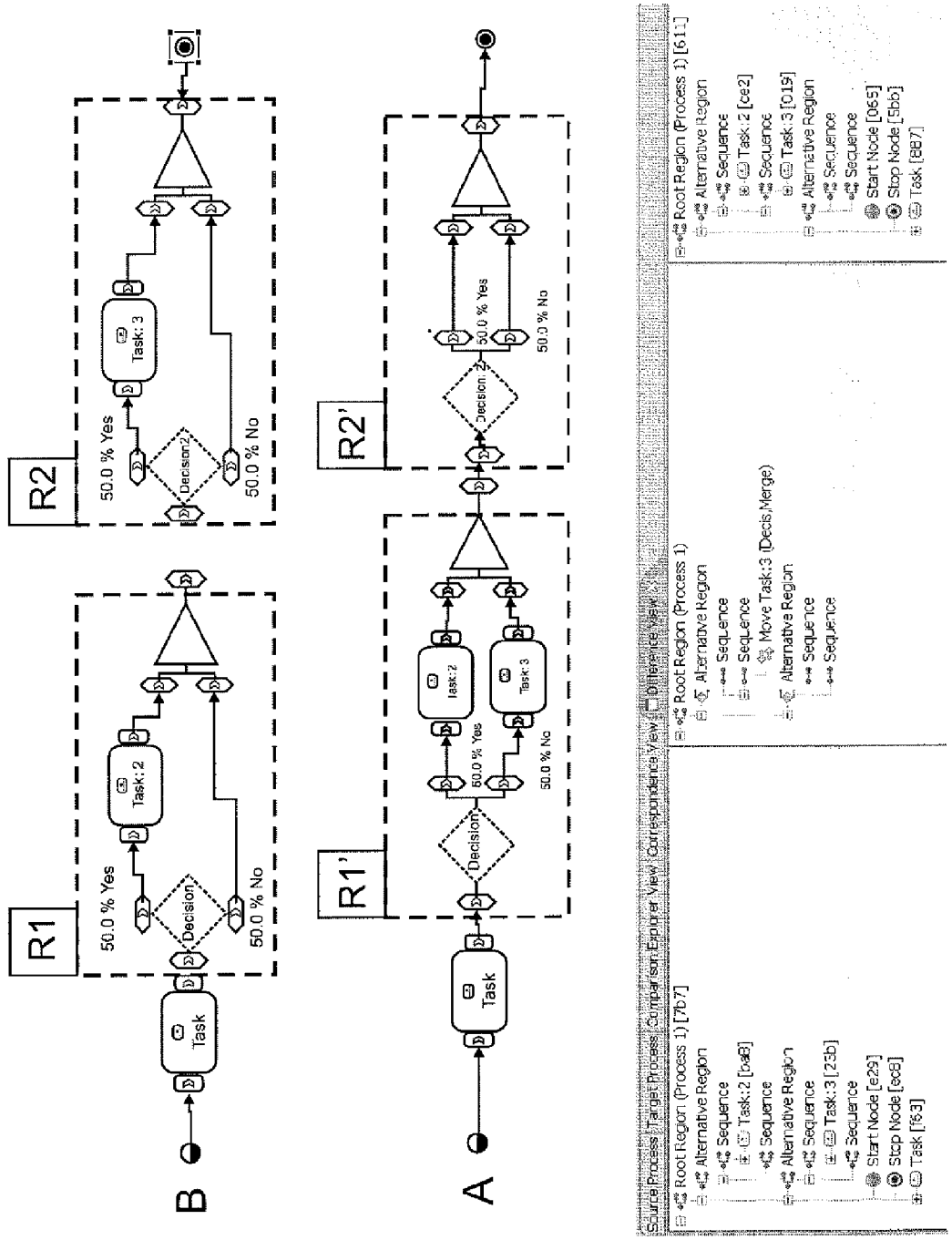
FIG. 6 shows a difference display produced by the FIG. 1 system illustrating an inter-region control flow difference.

FIG. 6 shows an example of the difference display displayed to a user for an inter-region control flow difference recorded in the difference log. In the secondary model A in this figure, the task Task:3 has been moved from R2' to R1'. This is identified using the previous algorithm and visualized in the difference view as shown. The upper section of the difference view displays a representation of the corresponding regions of the two models in which the difference occurs. The lower section of the display displays the contents of the region of the hierarchical difference log structure corresponding to the relevant regions of the two models. In particular, the central column gives details of the difference based on the structure of the combined region hierarchy described above. This indicates the difference in question in the form of an operational instruction "Move Task 3". The left and right hand columns give details of the structure of the corresponding regions of the models B and A respectively. Although not indicated in this particular view, difference analyzer 6 can also calculate and display an appropriate insertion point in the model structure for the element to be moved. This is done using a "fixpoint" technique which will be described later.

Complex control flow differences arise if SESE regions are newly inserted or deleted. Newly inserted SESE regions can be identified because for those no matching partner in the primary model will be found, deleted SESE regions can be identified because for those no matching partner in the secondary model can be found. The following pseudo code provides an implementation for calculating those complex control flow differences in difference analyzer 6.

Calculation of Deleted Regions:

```
List deletedRegions = new ArrayList( );
Iterator subRegions = PrimaryModel.getRegionsOfGraph( ).iterator( );
while (subRegions.hasNext( )) {
    Region subRegion = (Region) subRegions.next( );
    if (subRegion.getMatchingRegion( )==null) {
        deletedRegions.add(subRegion);
    }
}
```

Calculation of Inserted Regions:

```
List insertedRegions = new ArrayList( );
Iterator subRegions = SecondaryModel.getRegionsOfGraph( ).iterator( );
while (subRegions.hasNext( )) {
    Region subRegion = (Region) subRegions.next( );
    if (subRegion.getMatchingRegion( )==null) {
        insertedRegions.add(subRegion);
    }
}
```

Figure 7:
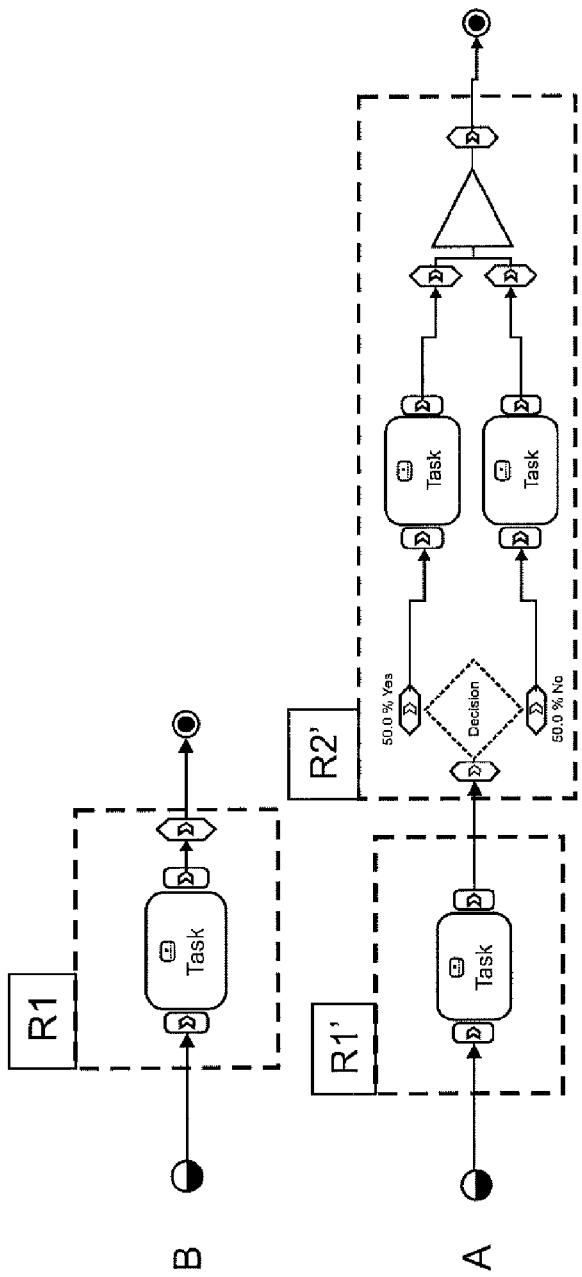
FIG. 7 shows another difference display illustrating a complex control flow difference.
Figure 7:
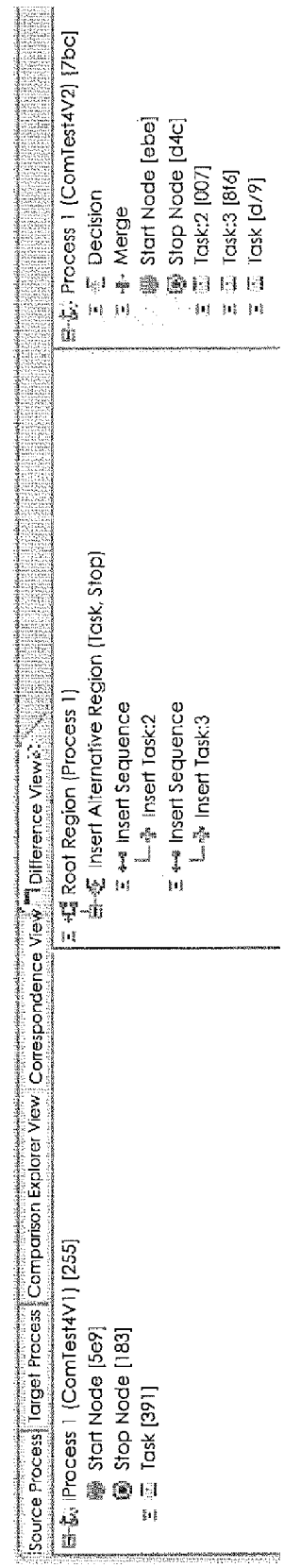

FIG. 7 shows an example of the difference display where a complex control flow difference occurs. In the secondary model A a new region (an Alternative Region) has been added. This is identified using the previous algorithm and visualized in the difference view. Again, difference analyzer 6 can calculate an insertion point for this alternative region using the fixpoint technique described below.

Figure 8:
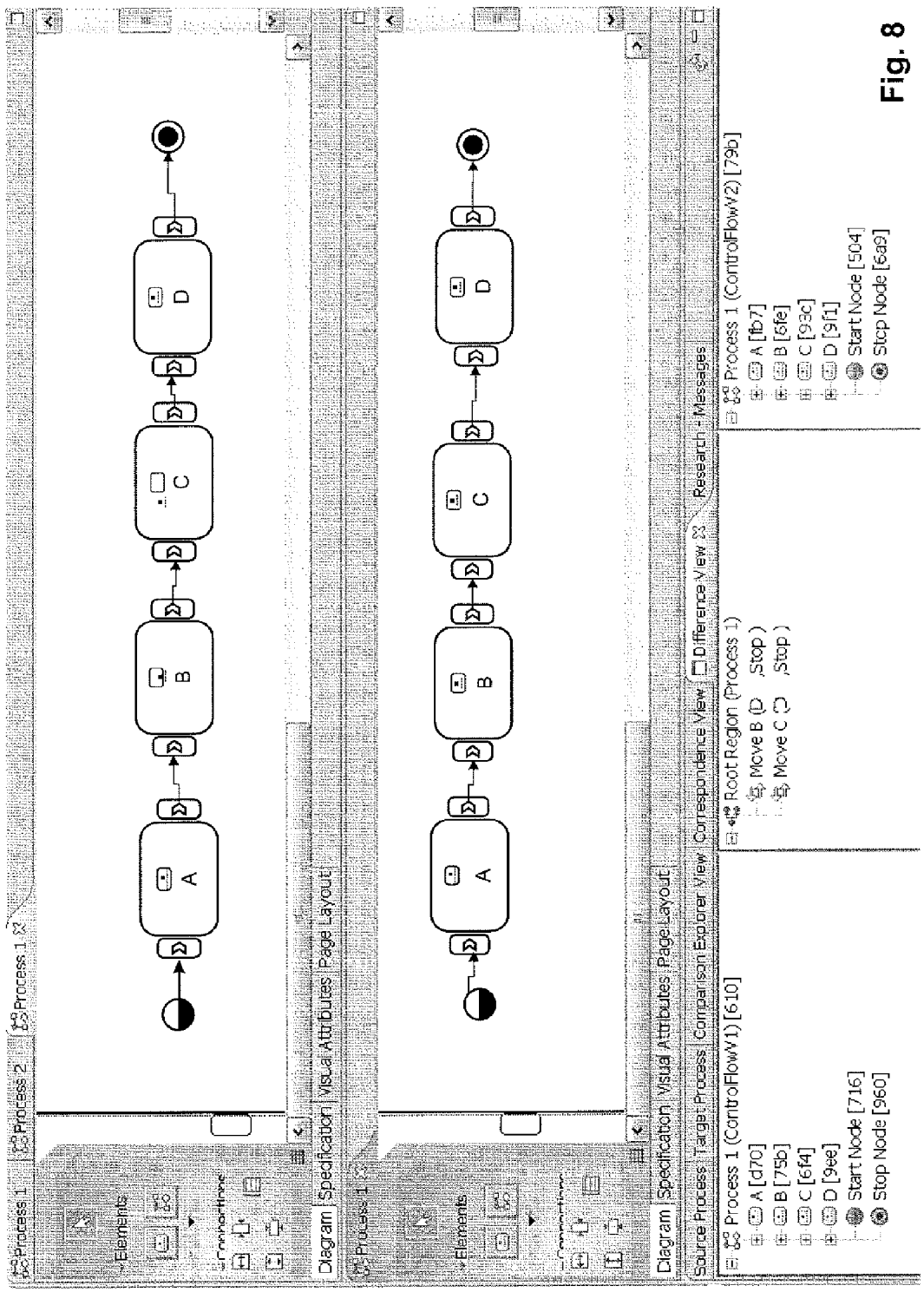
FIG. 8 shows a further difference display illustrating a control flow difference within a sequential SESE region.

An example of a control flow difference occurring in a linear sequential SESE region is illustrated in the difference view of FIG. 8. Such differences can be identified by difference analyzer 6 in various ways based on analysis of predecessor and successor elements of a given element in the control flow. For example, given an element n in the primary model, its control flow conflicts are calculated as follows. First, its predecessors and successors in the primary model are calculated. Second, the predecessors and successors of the corresponding element n' in the secondary model are calculated. Third, these sets are compared. If a node x is a predecessor in the primary model but a successor in the secondary model, this represents a control flow conflict. If a node x is a successor in the primary model but a predecessor in the secondary model, this represents a control flow conflict as well. Based on the identified conflicts as will be apparent to those skilled in the art, difference analyzer 6 can detect changes to the control flow and express these as a set of operations to resolve the control flow conflicts. This is indicated in the difference view of FIG. 8 for the particular control flow difference illustrated.

The fixpoint technique mentioned above will now be described in more detail. In the case of differences identified as move operations in the difference log, the user should be told where the element can be moved to in order to resolve the difference. In case of differences identified as insertion operations, the user should be told where the element can be inserted. For this purpose, we introduce the concept of fixpoints. Fixpoints are used to determine the edges of a region in the primary process model, where an element has to be inserted or moved to, according to its position in the matching region in the secondary process model. A formal definition of fixpoints is given first:

An element $x_P$ of the primary process model is called fixpoint, if it has a corresponding element $x_S$ in the secondary process model and the following requirements are fulfilled:

the surrounding regions of $x_P$ and $x_S$ are matching, $x_P$ has not been marked as moved.

Figure 9:
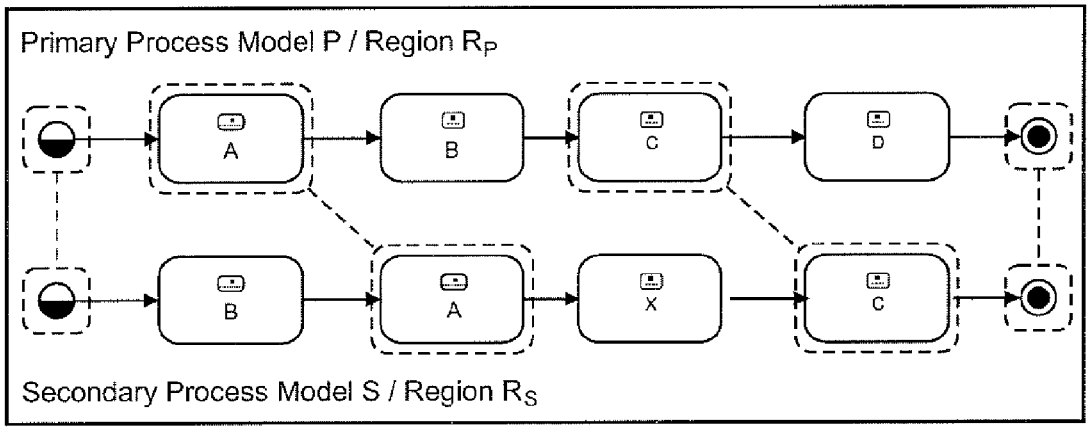
FIG. 9 shows an example of corresponding SESE regions used in explaining an insertion point identification technique employed in the FIG. 1 system.

FIG. 9 provides an example and depicts two process models. The upper one is a primary process model P and the lower one a secondary process model S.

Between P and S in FIG. 1 the following differences will be detected by the difference analyzer 6:

Move element B (Move element A instead of B would also be possible, though in the following we assume Move element B)

Insert X

Delete D

All differences concern the matching regions $R_P$ and $R_S$ delimited by the outer rectangles. According to our definition of Fixpoints the elements Start, B, C and Stop are Fixpoints of region $R_P$ of the primary process model. In FIG. 9 the Fixpoints of $R_P$ and their corresponding Fixpoints $R_S$ are highlighted with dashed rectangles.

For each detected Move and Insert difference the calculation of Fixpoints is divided into two steps: the calculation of a Fixpoint predecessor and the calculation of a Fixpoint successor. In order to calculate the Fixpoint predecessor of the Insert X difference, the algorithm starts at the position of X in the secondary process model and examines the predecessors of X in reverse control flow order. The first predecessor is element A, which fulfills all requirements of our definition of a Fixpoint, thus A is the Fixpoint predecessor of X. The calculation of the Fixpoint successor of X is analogous to the calculation of the Fixpoint predecessor, except that the successors of X are examined in control flow order. The Fixpoint successor of X is C. So X has to be inserted in the primary process model between A and C, in other words the edges (A-B) and (B-C) are possible insertion points. The following algorithms calculate the Fixpoint predecessor and successor for a given element e.

```
getFixpointPredecessor(e) {
    for each e.getPredecessors p {
        if (p.hasCounterpartInParentRegion( ) &&
            !p.isMovedWithinRegion( )) {
            return predecessor;
        } else {
            return getFixpointPredecessor(p);
        }
    }
    return null;
}
```

```
getFixpointSuccessor(e) {
    for each e.getSuccessors s {
        if (s.hasCounterpartInParentRegion( ) &&
            !s.isMovedWithinRegion( )) {
            return predecessor;
        } else {
            return getFixpointSuccessors(s);
        }
    }
    return null;
}
```

Thus, the SESE region hierarchies for the models can be analyzed (together with the models themselves if necessary for any control flow information not directly indicated in the hierarchies) to identify insertion points for elements. When an insertion point has been calculated by difference analyzer 6, this can be recorded in the difference log and displayed to the user as required.

Figure 10:
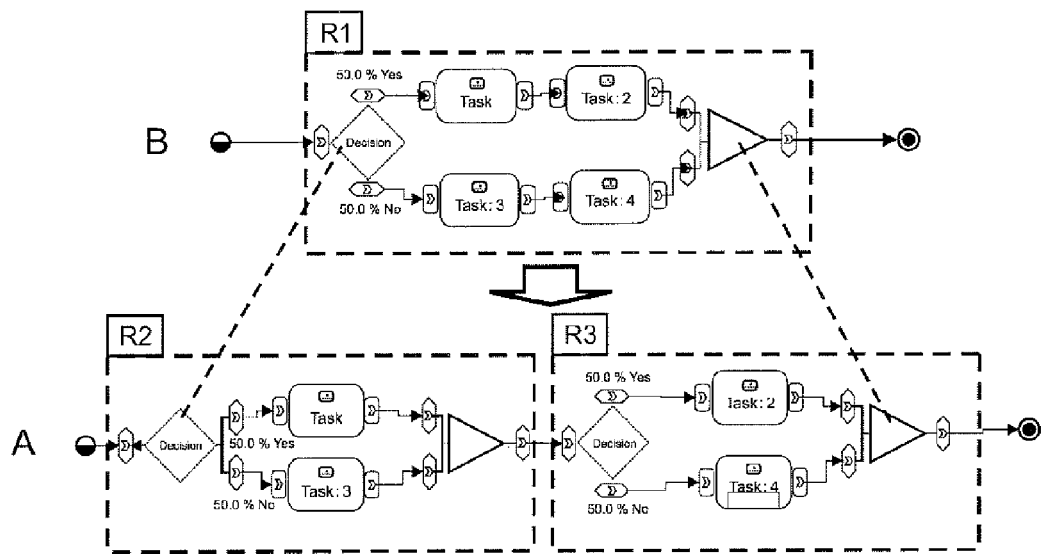
FIGS. 10 and 11 show examples of corresponding SESE regions using in explaining a difference filtering technique employed in the FIG. 1 system.

The foregoing describes the detection and visualization of elements if they are moved, inserted or deleted. However, there are elements that should be treated in a different way. In particular, if a control action node element (such as a decision, merge, fork or join node) is moved from one SESE region to another, it does not always make sense to visualize it as a moved element. FIG. 10 shows such an example. In this example, we assume that there is a 1-to-1 correspondence between the first decisions and last merges in models B and A, as indicated by the bold dashed lines. The other merge and Decision represent newly inserted elements in process model A. We further assume that R1 and R2 are matched and that R3 represents a newly inserted region. Note that in such a case it does not make sense to visualize the last merge as a moved element and the first merge and Decision:2 as newly inserted elements in region R2 and region R3, respectively, because they are both part of a well-formed SESE region and they represent the entry and exit elements of these regions. If they were visualized and offered for addition or offered to be moved, then this would lead to an incorrect process model.

Figure 11:
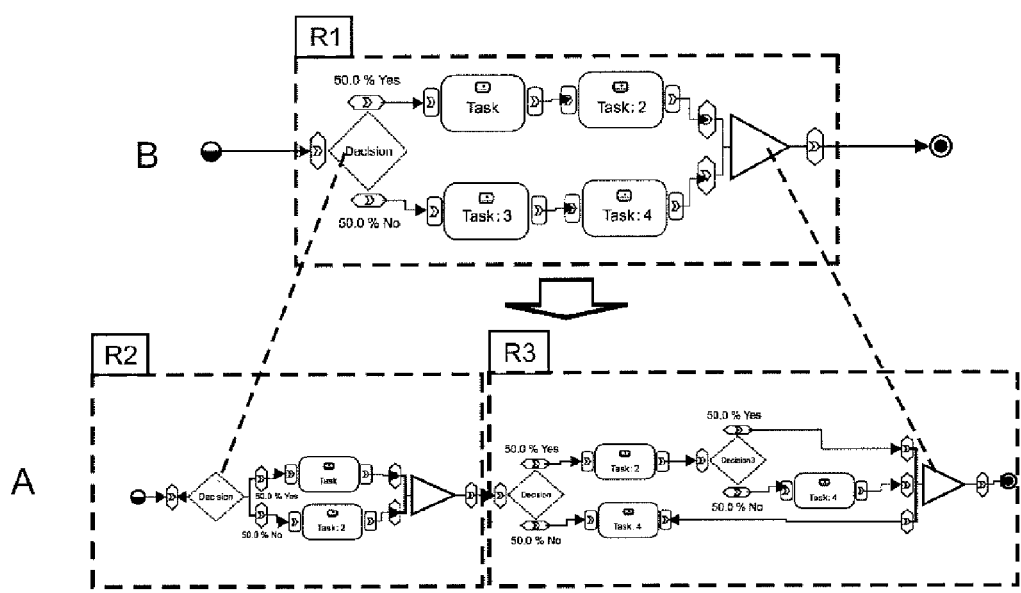

On the other hand, there are cases where such control actions should be visualized as newly inserted elements or moved elements. This is the case if they are not entry or exit elements of a well-formed SESE region, such as in FIG. 11. Here, the Decision:3 has been newly inserted and it should be visualized as such an element. All the other elements should not be visualized as moved or newly inserted because they are first or last elements of SESE regions. In a similar way, we can treat deleted control actions which are then created again, and which will lead to 1-to-0 and 0-to-1 correspondences in the comparison. If no additional actions are taken, they will be represented as deleted and inserted elements. As a consequence, we describe below an approach whereby difference analyzer 6 can distinguish between those elements that should be visualized and those that should not. In accordance with this technique, the decision whether to include a difference relating to a control action node in the difference log is dependent on whether that control action node and any corresponding element in the other SESE region hierarchy are boundary node elements, where a "boundary node element" here is an entry or exit node of a SESE region.

The difference analyzer applies the following basic rules for inclusion of control action changes in the difference log, and hence visualization of these changes in the difference display.

(R1) If the control action is an entry/exit of a region in the primary model and is not an entry/exit of a region in the secondary model, this change will be visualized.

(R2) If the control action is an entry/exit of a region in the primary model and remains an entry/exit of a region in the secondary model, this change will not be visualized.
(R3) If the control action is not an entry/exit of a region in the primary model and becomes an entry/exit of a region in the secondary, this change will be visualized.
Additional rules can be constructed for dealing with the case where the control action is not an entry/exit of region in the primary model and remains such a node, allowing this change to be visualized in some cases and not in others. Possible rules here will be apparent to those skilled in the art. In simple embodiments, however, the difference analyzer may simply include such differences for visualization in the difference display.

The above explains how and why control action elements should be treated in a special way for change visualization. For a two-way merge of two process models, this is sufficient. However, there are scenarios where correspondences should be adjusted after region matching if control action changes have been made. This is explained in the following.

Figure 12:
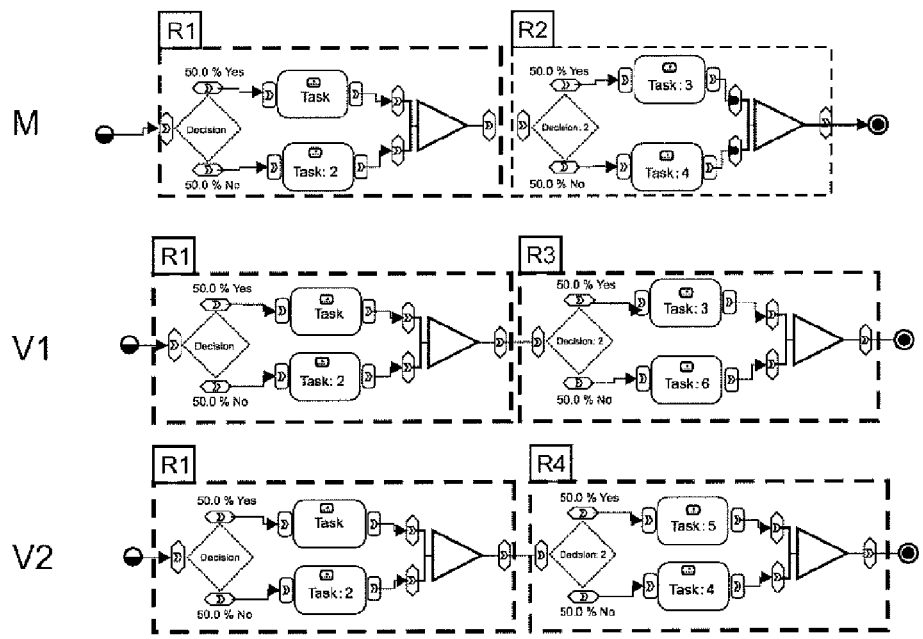
FIG. 12 illustrates corresponding SESE regions in a scenario where adjustment of correspondences is performed in the FIG. 1 system.

Overall, region matching is used to identify similar regions. This region matching is partially based on corresponding entry/exit nodes of two regions. We have explained that this strategy is not sufficient if control actions are deleted and recreated or if they are moved to other regions. In such cases, the result of region matching contains additional information that is not present in the correspondences. After process model merging, this additional information is lost if it is not encoded into correspondences. As a consequence, in merging scenarios where this additional information is important, correspondences should be adapted after region matching. Such a scenario is illustrated in FIG. 12. Here, we assume that models V1 and V2 are derived independently from a model M. We further assume that during such derivations, the control action nodes in regions R3 and R4 are deleted and newly created. Nevertheless, using the region matching approach described above, R2 will be matched with R3 and R4 when comparing M and V1 and M and V2. We can also compare V1 and V2 directly as has been described in "Methodology and Tooling for Business Processes with Automated Correspondence Calculation", Küster et al., IP.com, IPCOM000151093D, April 2007. However, as no correspondences exist between the control action nodes in R2 and R3 as well as R2 and R4, the transitive correspondences between these control action nodes will not be established (see the reference just mentioned for a detailed algorithm defining how this can be done). Further, our region matching will not be able to match region R3 and R4 because they also do not contain any corresponding elements, as these have been deleted. As a consequence, a deleted and a newly inserted region will be displayed, which is not very useful. However, if the correspondences between M and V1 and M and V2 are adjusted after region matching has taken place, the region matching information will be encoded into the correspondences. For example, if region R2 in M is matched with region R3 in V1, one could re-establish 1-to-1 correspondences for the entry/exit control actions. If this is done also for region R4 in V2 and region R2 in M, then the transitive correspondences between the entry/exit nodes in R3 and R4 will exist and then the comparison between V1 and V2 will show that Task:5 is deleted and Task:6 is inserted. This example shows the necessity of adjusting correspondences if the models are used in further comparisons. The algorithm below indicates an approach which can be employed by region matcher 4 to achieve this.

```
For all regions R in the primary model do
{
    if r has a matching region Rm in the secondary model
    {
        adjustCorrespondencesofEntryAndExitNodes(R,Rm);
    }
}
procedure adjustCorrespondencesofEntryAndExitNodes(R,Rm)
{
    if entrynode(R) has no correspondence to entrynode(Rm)
    {
        removeCorrespondence(entrynode(R));
        removeCorrespondence(entrynode(Rm));
        insertCorrespondence(entrynode(R),entrynode(Rm);
    }
    if exitnode(R) has no correspondence to entrynode(Rm)
    {
        removeCorrespondence(exitnode(R));
        removeCorrespondence(exitnode(Rm));
        insertCorrespondence(exitnode(R),exitnode(Rm);
    }
}
```

As described earlier, the user can navigate through the difference log, viewing the difference display, and interact with the system to eliminate differences between the models. In response to user input changing a model, the model analyzer 4 can update the SESE region hierarchy representation, and the difference analyzer 6 can update the difference log to reflect the change. Difference analyzer 6 can also update the correspondence files $Comp_M$ and $Comp_R$ as necessary to reflect any altered correspondences resulting from merging operations. The difference display generated from the structured difference log presents differences in a way that is particularly useful for the modeler, facilitating handling of large numbers of changes to large process models. When given a large process model, a long list of differences would be confusing. However, system 1 displays differences in a structured way that is similar to the structure of the process model itself. This enables the detection of dependent changes such as the insertion of a decision and a merge node with additional tasks in between. (See, for example, FIG. 7 where the dependency between the addition of region R2', as a first difference, and the addition of the elements within that region as subsidiary differences, must be respected. That is, the first difference must be resolved before the subsidiary differences are dealt with.) The system also allows treatment of other dependent changes in a suitable way, e.g. to forbid the insertion of a decision node without the insertion of the following merge node. The association of differences with the SESE regions they occur in also allows distinguishing of different categories of differences and the handling of these different categories in a systematic way. System 1 also facilitates a layered approach to resolving differences, whereby structural differences can be resolved first, then attribute differences can be dealt with. For this purpose, a new attribute difference display could be generated that focuses on displaying attribute differences for elements that have a 1-to-1 correspondence. Overall, therefore, it will be seen that system 1 provides a highly efficient tool for comprehensive difference resolution in process merging operations, and one which does not rely on the prior existence of a change log.

It will of course be appreciated that many changes and modifications can be made to the particular embodiments described above without departing from the scope of the invention. For example, while the operation of the above embodiment has been described in connection with merging of two process models, the same principles can be applied in general to merging of two or more process models.

The invention claimed is:

1. A method for production in a data processing system of a difference log defining differences between a plurality of process models defined in memory of the system, the method comprising:
for each process model of the plurality of process models, providing, in a memory, model structure data defining a hierarchy of Single-Entry-Single-Exit (SESE) regions representing the structure of that process model;
providing, in the memory, model comparison data defining correspondences between elements of the process models;
comparing regions of the SESE region hierarchies defined by said model structure data to detect correspondences between regions and to generate region comparison data defining the correspondences and providing, in the memory, region comparison data defining correspondences between regions of SESE region hierarchies for the process models;
analyzing the model comparison data and the region comparison data to identify differences between the SESE region hierarchies; and
producing a difference log defining said differences in the memory, the difference log indicating, for each difference, a region of at least one of said SESE region hierarchies in which that difference occurs.

2. A method according to claim 1 including providing, in the memory, combined hierarchy data defining a combined SESE region hierarchy comprising the SESE region hierarchies for the process models, wherein the difference log has a hierarchy of regions corresponding to the combined SESE region hierarchy, each difference being indicated in the region of the difference log hierarchy corresponding to the region of the combined SESE region hierarchy in which that difference occurs.

3. A method according to claim 2 including processing the region comparison data and the model structure data for the process models to generate said combined hierarchy data.

4. A method according to claim 1 further comprising displaying at least one of a difference, regions including differences, and operational instructions for modifying at least one process model to address at least one difference.

5. A method according to claim 1, further comprising step of:
receiving at least one update to at least one process model;
generating new region comparison data; and
after generating said new region comparison data, updating said model comparison data to include any new correspondences between elements of corresponding regions of the process models.

6. A method according to claim 1 including analyzing at least one of the process models defined in system memory to detect hierarchical SESE regions thereof, and generating the model structure data defining the SESE region hierarchy for that process model.

7. A method according to claim 1 including, in response to user input indicating a region of said SESE region hierarchy, identifying from the difference log any differences associated with that region, and producing a difference display displaying said differences to the user.

8. A method according to claim 7 including providing, in the memory, combined hierarchy data defining a combined SESE region hierarchy comprising the SESE region hierarchies for the process models, wherein the difference log has a hierarchy of regions corresponding to the combined SESE region hierarchy, each difference being indicated in the region of the difference log hierarchy corresponding to the region of the combined SESE region hierarchy in which that difference occurs, and wherein, in response to said user input indicating a region of a SESE region hierarchy, any differences indicated in a corresponding region of the difference hierarchy are identified and displayed in said difference display.

9. A method according to claim 7 wherein said difference display displays a representation of the region of the SESE region hierarchy indicated in said user input and a representation of any corresponding region or regions of the or each other SESE region hierarchy.

10. A method according to claim 1 including, in response to user input modifying a process model to eliminate a difference, updating the model structure data for that process model and updating the difference log to eliminate that difference.

11. A method according to claim 1 including, in the step of analyzing the comparison data to identify differences, identifying differences in control flow between the SESE region hierarchies.

12. A method according to claim 1 including, for at least some of said differences which relate to an element of a second of the SESE region hierarchies for which a corresponding element can be moved or inserted in a first SESE region hierarchy to eliminate that difference, identifying an insertion point in the first hierarchy for said corresponding element by:
analyzing the second hierarchy to identify for said element of that hierarchy preceding and succeeding fixpoint elements in the control flow of that hierarchy, where a fixpoint element x is an element which has a corresponding element x' in the first hierarchy such that (a) the enclosing SESE regions of elements x and x' are defined as corresponding regions in said region comparison data, and (b) the difference log does not indicate that the element x has been moved; and
recording said insertion point in the difference log as a point between the respective elements in the first hierarchy which correspond to the preceding and succeeding fixpoint elements in the second hierarchy.

13. A method according to claim 1 including, for a difference between two said SESE region hierarchies which relates to a control action node element in a first of said hierarchies, deciding whether to include that difference in the difference log in dependence on whether the control action node element and any corresponding element in the second SESE region hierarchy are boundary node elements.

14. A non-transitory computer readable medium containing executable program instructions for producing a difference log defining differences between process models defined in memory of a data processing system, the executable program instructions comprising instructions for:
for each process model of the plurality of process models, providing, in a memory, model structure data defining a hierarchy of Single-Entry-Single-Exit (SESE) regions representing the structure of that process model;
providing, in the memory, model comparison data defining correspondences between elements of the process models;
comparing regions of the SESE region hierarchies defined by said model structure data to detect correspondences between regions and to generate region comparison data defining the correspondences and providing, in the memory, region comparison data defining correspondences between regions of SESE region hierarchies for the process models;
analyzing the model comparison data and the region comparison data to identify differences between the SESE region hierarchies; and producing a difference log defining said differences in the memory, the difference log indicating, for each difference, a region of at least one of said SESE region hierarchies in which that difference occurs.

15. A system for producing a difference log defining differences between process models, the system comprising:
memory storing, for each of the process models, model structure data defining a hierarchy of Single-Entry-Single-Exit (SESE) regions representing the structure of that process model, model comparison data defining correspondences between elements of the process models, and region comparison data defining correspondences between regions of SESE region hierarchies for the process models; and
control logic configured to compare regions of the SESE region hierarchies defined by said model structure data to detect correspondences between regions, and to generate and store in the memory region comparison data and to analyze the model comparison data and the region comparison data to identify differences between the SESE region hierarchies, and to produce and store, in the memory, a difference log defining said differences, the difference log indicating, for each difference, a region of at least one of said SESE region hierarchies in which that difference occurs.

16. A system according to claim 15 wherein the control logic is configured such that the difference log has a hierarchy of regions corresponding to a combined SESE region hierarchy, defined by combined hierarchy data stored in the memory and comprising the SESE region hierarchies for the process models, each difference being indicated in the region of the difference log hierarchy corresponding to the region of the combined SESE region hierarchy in which that difference occurs.

17. A system according to claim 16 wherein the control logic is configured to process the region comparison data and the model structure data for the process models to generate said combined hierarchy data.

18. A system according to claim 17 wherein the control logic is configured to display at least one of a difference, regions including differences, and operational instructions for modifying at least one process model to address at least one difference.

19. A system according to claim 15 wherein the control logic is responsive to user input indicating a region of a SESE region hierarchy to identify from the difference log any differences associated with that region, and to produce a difference display displaying said differences on a user interface.

20. A system according to claim 15 wherein the control logic is configured, in analyzing the comparison data to identify differences, to identify differences in control flow between the SESE region hierarchies.

* * * * *